INVENTOR
William G. Hegmann

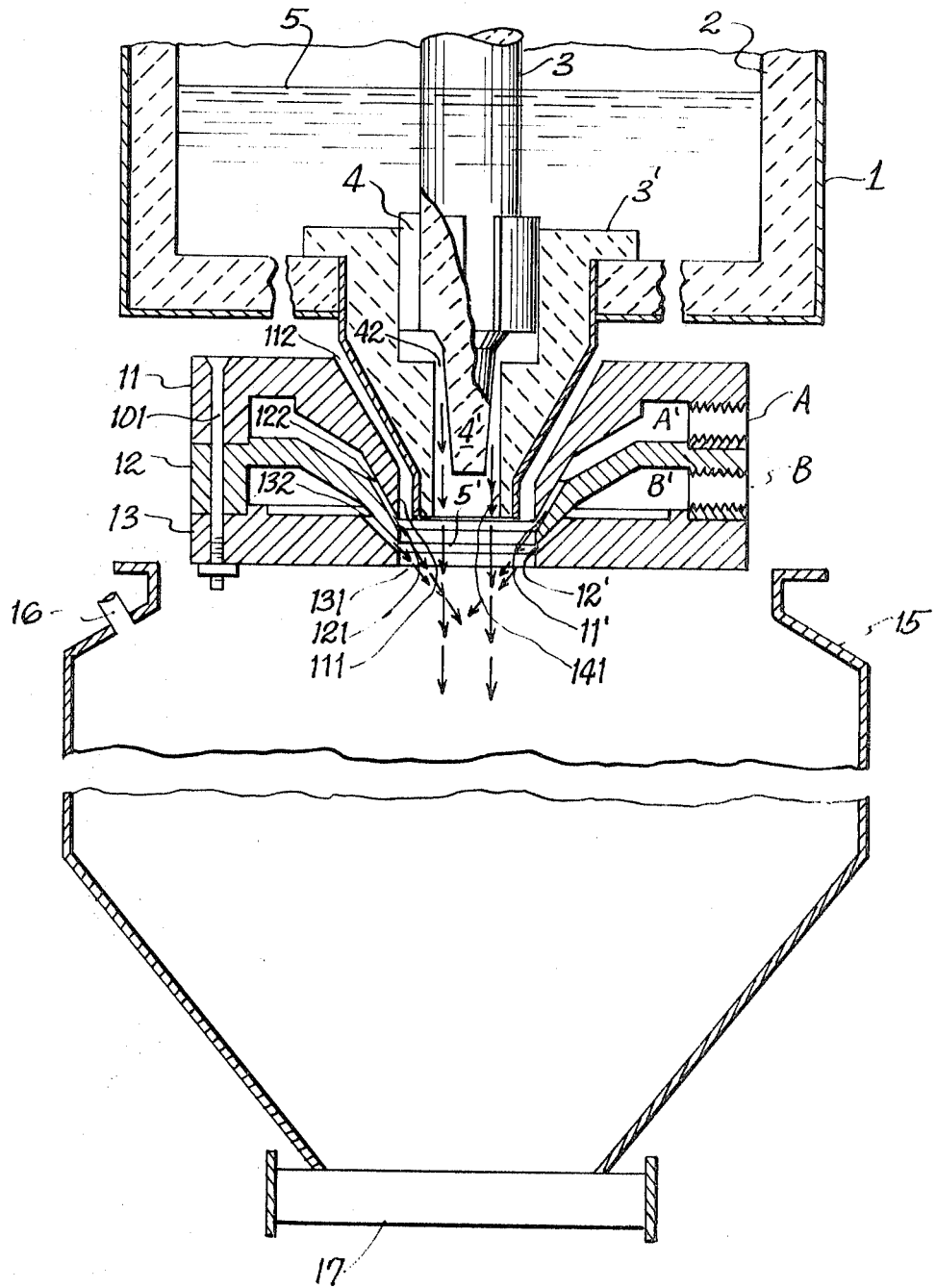

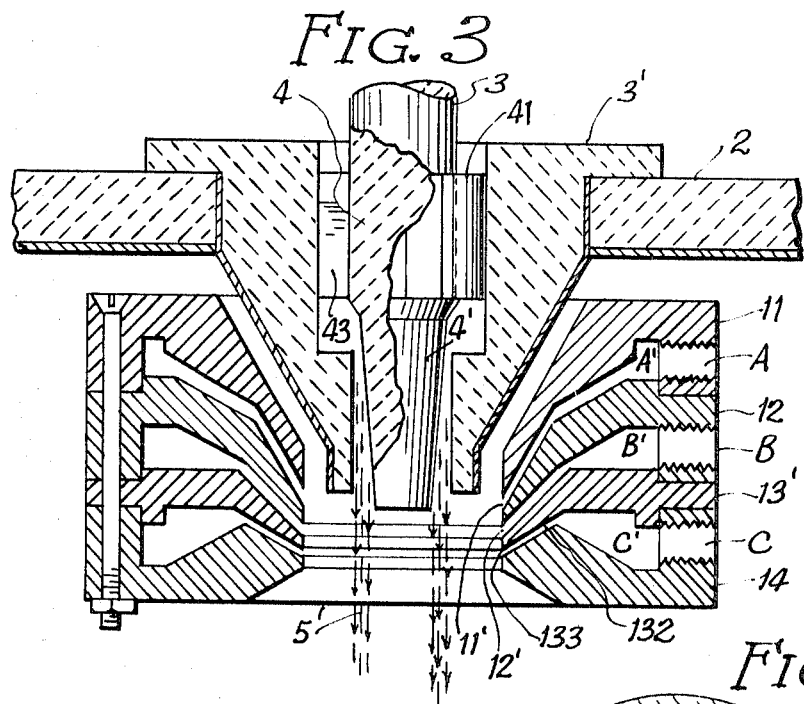
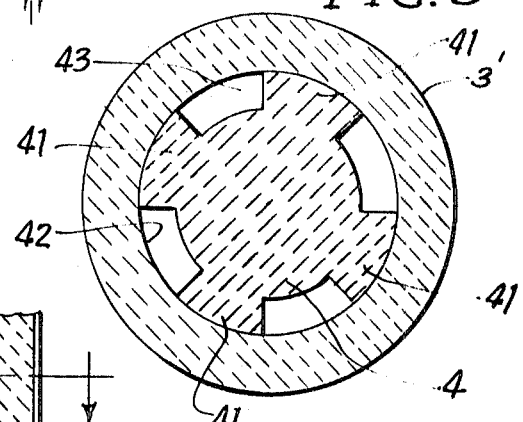
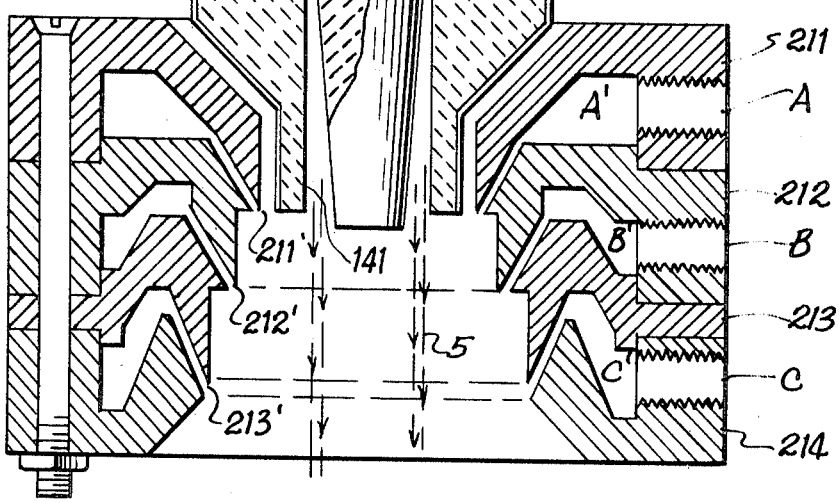

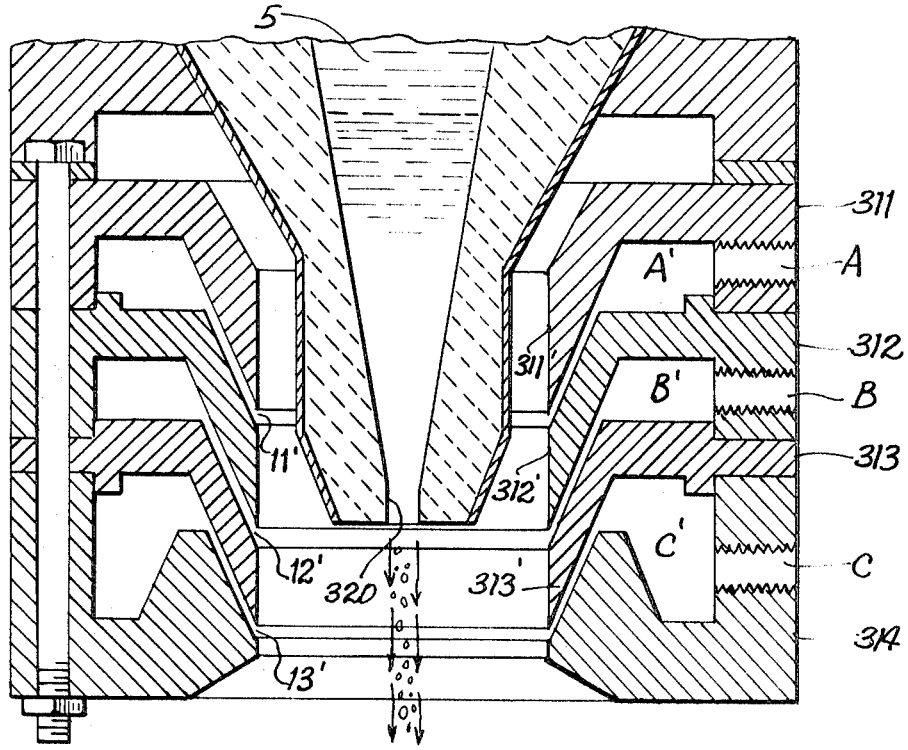
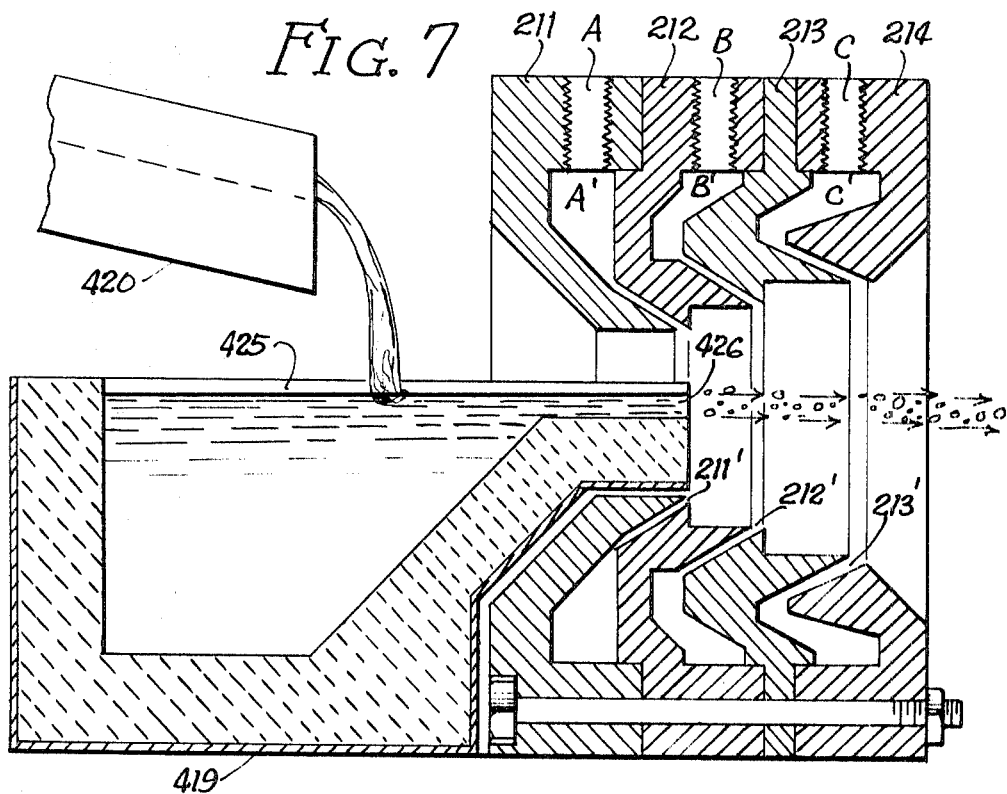

United States Patent Office 3,588,951
Patented June 29, 1971

3,588,951
FRACTIONAL DISINTEGRATING APPARATUS
William G. Hegmann, 204 NE. 4th St.,
Sandoval, Ill. 62882
Filed Nov. 8, 1968, Ser. No. 774,428
Int. Cl. B22d 23/08
U.S. Cl. 18—2.5                                14 Claims

ABSTRACT OF THE DISCLOSURE

A system for producing comminuted material wherein a stream of molten material is subjected to high pressure fluid blasts which break the material into particles which will solidify when cooled. The specific improvement of the invention involves the provision of nozzle means for directing a first blast onto an exposed surface of a moving stream of molten material. The nozzle means includes at least one additional outlet for directing additional blasts onto the exposed surface of the moving stream at a point downstream of the first contact. Means are provided for regulating the stream to facilitate the formation of satisfactory product.

---

This invention relates to an improved system for comminuting material. The invention is specifically directed to the provision of a molten stream of material which is broken into particles with the particles then being solidified to provide the comminuted product. The invention is particularly applicable to the comminuting of molten metal, and a wide range of compositions can be advantageously utilized in the system of this invention.

Various techniques have been employed for producing metal particles from molten metal. A system of this type is described, for example, in Calbeck Pat. No. 1,511,215, issued in 1924. In this patent, a stream of molten metal is passed through the center bore of a nozzle, and a high pressure stream of air surrounded by fuel gas is directed into contact with the molten stream. Hegmann Pat. No. 2,868,587 represents a more recent nozzle construction which is particularly suitable for producing metallic dust or powder.

In spite of the variety of systems used for many years, difficulties have been encountered from the standpoint of securing suitable consistency in the ultimate product. For example, in the manufacture of steel shot, there are certain sizes which are used for certain applications. When producing the shot, it has been found that existing systems will provide a product varying over a wide range of sizes so that only a relatively small percentage of the product will be within the desired size range. Prior systems are also characterized by the tendency to produce excessive oxidation of the product which is undesirable for many applications.

It is a general object of this invention to provide an improved system for the comminuting of molten material.

It is a more specific object of this invention to provide an improved apparatus and method for the production of comminuted product wherein a large percentage of the product can be achieved in a narrow size range, and wherein excessive oxidation of the product can be avoided.

These and other objects of this invention will appear hereinafter and for purposes of illustration, but not of limitation, specific embodiments of the invention are shown in the accompanying drawings in which:

FIG. 2 is an enlarged fragmentary, sectional view illustrating the nozzle details of one form of the invention;

FIG. 3 is a fragmentary, cross-sectional view illustrating an alternative nozzle arrangement;

FIG. 4 is a fragmentary, cross-sectional view illustrating a still further nozzle arrangement;

FIG. 5 is a horizontal, sectional view taken about the line 5—5 of FIG. 5;

FIG. 6 is a fragmentary, sectional view illustrating an additional alternative; and, FIG. 7 is a schematic elevational view, partly in section, illustrating a modified arrangement of the invention.

Figure 1:
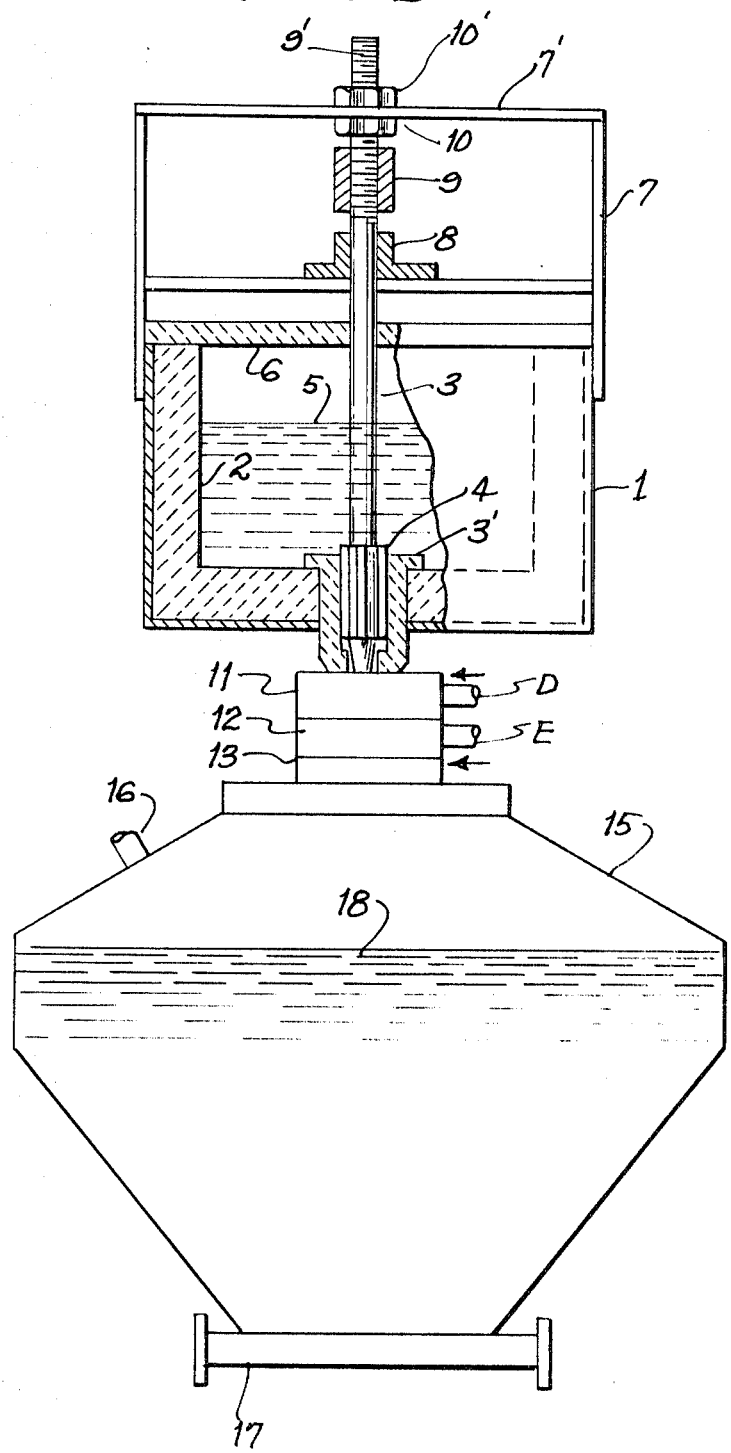
FIG. 1 is a schematic elevational view, partly in section, illustrating an apparatus characterized by the features of this invention.

The system of this invention involves the use of certain standard techniques in that a stream of molten metal is delivered from a holding furnace or the like, and a surface of the stream is exposed for engagement by a high pressure fluid blast. This causes the molten material to break into particles which will solidify when cooled.

A specific improvement of this invention involves the use of a nozzle means positioned to direct the fluid blasts into engagement with the metal stream. The nozzle means included a first outlet for directing the fluid blast into contact with the molten stream. At least one additional outlet is provided in the nozzle means so that at least one additional fluid blast will engage the stream at a point downstream of the point of initial engagement.

When the first fluid blast contacts the stream, at least the outer portions of the stream are atomized so that the "stream" engaged by the second blast will include at least some particles of molten material, and if the original diameter of the stream was large enough, additional molten material will not be atomized until contacted by the second or later fluid blasts. The break-up of the molten material thus occurs in stages.

The invention also covers the use of valve means which provide for control of the nature and magnitude of the molten stream. It has specifically been found that the provision of a narrow stream, for example, as can be produced by providing a tubular stream, will provide a more desirable end product. In addition, the particular particle size can be regulated by regulating the molten stream, and the valve means of the invention are particularly suitable for this purpose. The valve means also provide a simple arrangement for correcting problems which might occur; for example, freezing of the material before passage of the material out of the holding furnace.

FIG. 1 illustrates a holding vessel 1 having a refractory lining 2 and a refractory cover 6. This vessel may comprise a melting or holding furnace for the molten material 5. The material is adapted to be passed out of the furnace through an opening defined by the cylindrical valve element 3'. A plug 4 connected to valve stem 3 fits within the cylinder 3' comprising in this arrangement a bottom tap metering orifice.

The stem 3 extends through sleeve 8, and the threaded end 9' of the stem is received in threaded sleeve 9 and adjusting nuts 10 and 10'. A cross bar 7' of the frame 7 provides support for these parts. It will be appreciated that this arrangement permits raising and lowering of the plug 4 relative to the cylindrical element 3'.

Nozzle means are located beneath the outlet of the vessel 1. As will be explained, these nozzles provide for the impingement of fluid blasts onto the surface of a molten stream issuing from the vessel. This breaks the molten material into particles, and these particles pass downwardly into collecting tank 15 containing the coolant 18. An air vent 16 is provided at the top of the tank, and a dewatering screw conveyor 17 is located at the bottom of the tank for collecting the solid comminuted material.

FIG. 2 illustrates a suitable nozzle construction. The construction is formed of three parts, 11, 12 and 13, secured together, for example, by means of bolts as shown at 101. The part 11 defines a circular center bore 111 and an outwardly flared upper portion 112, which is dimensioned to conform with the outer configuration of the cylindrical discharge element 3'.

One important feature of the invention results from the fact that the blast streams issuing from the nozzle create a negative pressure (suction) on the liquid molten stream and thus enhance the liquid flow. This is especially suitable where viscous or non-free flowing molten metals and alloys are being processed. The secondary air to create the suction effect is drawn downwardly through the annular passage defined between the outwardly flared upper portion 112 and the outer configuration of the cylindrical discharge element 3'.

The part 12 of the nozzle includes a cylindrical portion 121 and an outwardly flared continuation which forms a channel 122 in conjunction with the bottom surface of the part 11. Similarly, the part 13 defines a cylindrical portion 131 and an outwardly flared continuation forming a channel 132. The channels 122 and 132 terminate in annular outlet openings 11' and 12'. The enlarged annular passages A' and B' receive fluid through openings A and B. In the preferred design of the construction of FIG. 2 as well as in the case of the other structures to be described, the length of the channels 122 and 132 is at least one-third the inner diameter of the nozzle.

The plug 4 associated with the cylindrical element 3' defines a tapered end 4' which is received within the passage 141. It will be appreciated that the position of the tapered end 4' determines the size of the opening 142 through which the stream 5' of molten material passes. It will also be noted that the stream 5' is tubular, and that the thickness of the stream will also depend upon the position of the tapered end 4'. If the plug 4 is lowered sufficiently, it will completely shut off the flow of molten material. The plug 4 may be circular or non-circular to provide streams of various configurations. In any case, this arrangement is particularly suitable as a means for controlling the flow rate of material.

It will be noted that the angles of the channels 122 and 132 are such that the streams issuing from the outlets 11' and 12' would have a conical shape (without the presence of the stream 5') and that the vertices of the cones met at a common point. It has been found that this design is particularly suitable for producing fine particle size material, for example, in the order of 325 mesh.

FIG. 3 illustrates a modified version of the invention wherein the nozzle is formed of parts 11 and 12 to provide an outlet 11' as described with reference to FIG. 2. The part 13' is, however, modified to provide a taper between wall 132 whereby a third outlet 133 will be formed in conjunction with the part 14. The passage C' will provide fluid delivered through the opening C. The arrangement of FIG. 3 thus provides three separate fluid blasts for impingement upon the molten stream 5'. These blasts have a common vertex as explained relative to FIG. 2.

In FIG. 4, the nozzle is made up of parts 211, 212, 213 and 214. These nozzles provide three outlets, 211', 212' and 213'. In this case, however, the part 212 is stepped outwardly relative to the part 211 so that the outlet 212' is displaced outwardly relative to the outlet 211. A similar stepped arrangement is provided in the parts 213 and 214 whereby the outlet 213' is stepped outwardly for an even greater distance. It will be appreciated, however, that the outlet openings are all arranged so that each of the fluid blasts will independently contact the molten stream at respective downstream positions.

FIG. 5 serves to illustrate a further detail of the plug 4 which is integrally formed with the stem 3. This plug is provided with a plurality of splines 41 which extend into direct engagement with the wall 42 comprising a continuation of the passage 141. The splines serve to properly align the plug, and they also provide passages 43 through which the molten material passes prior to discharge around the tapered end 4'.

In the arrangement of FIG. 6, the nozzle parts 311, 312 and 313 define interior cylindrical surfaces 311', 312' and 313'. These surfaces are longer than the corresponding surfaces for the construction in FIG. 3 whereby the nozzle openings are spaced apart by a greater distance. This arrangement is particularly suitable where the molten stream 325 passing from the discharge opening 320 is a solid stream as opposed to the tubular stream previously referred to.

In the arrangement of FIG. 7, molten material is adapted to be poured from a trough 420 into the holding vessel 419. The molten material 425 is then passed over the lip 426 where it is contacted by fluid blasts issuing from a nozzle of the type shown in FIG. 4. It will be appreciated that any of the arrangements previously described can be modified to depart from the vertically downward movement of the molten stream. The fluid blasts employed for comminuting this stream serve as means for maintaining the stream out of contact with nozzle surfaces, and it is, therefore, not necessary to confine the invention to vertical movement.

An important feature of the instant invention involves the degree of control that can be achieved in producing a large percentage of product within a relatively narrow size range. Once a size range is selected, and the temperature and volume control of the fluid blasts are set, the major portion of the product can be maintained within the size range. This is a distinct improvement over prior art systems which would usually result in relatively small percentages of product within the desired size range. For example, when producing steel shot for use in shot peening and blast cleaning operations, the size range desired comprised shot passing a No. 18 screen but retained on a No. 120 screen. Employing conventional techniques, only about 25 percent of the product would fall within this range. The major percentage of the product is usually over-sized and must be subjected to relatively costly crushing operations. The following table illustrates results obtained on shot alloy with the nozzles of this invention (Test 1) and with a conventional nozzle.

SCREEN TESTS

| Test | Blast medium | $H_2O$ addition and/or air | Pressure, p.s.i. | Percent On #7 screen | Minus #7 on #18 | Minus #18 on #120 | Minus #120 |
| --- | --- | --- | --- | --- | --- | --- | --- |
| 1 | Air and water mixture | {348 c.f.m. / 2.32 g.p.m.} | 105 | 0.0 | 16.2 | 82.5 | 1.3 |
| 2 (conventional nozzle*) | Water | 885 g.p.m. | 12 | 13.0 | 63.6 | 22.4 | 1.0 |

*Sample representative of five days' production.

As can be seen, with the nozzle employed in Test 1 and with an air and water mixture over 80 percent of the product falls within the desired size range for shot peening and blast cleaning operations establishing a considerable improvement over conventional yields. Air and water mixtures ranging from 10 to 100 g.p.m. at pressures up to 1250 p.s.i. are suitably employed. Water only can, however, be advantageously used in amounts from 40 to 100 g.p.m. at pressures up to 3000 p.s.i. The use of superheated steam at 125 to 250 p.s.i. and at temperatures between 600 and 800° F. will also provide advantageous results. It will be understood that various other fluids or combinations of fluids may be used with the nozzle constructions.

The use of a mixture of gas and water as the blast medium is preferred since particularly good control of product sizes can be achieved with this fluid. The gas may comprise air; however, an inert gas, such as nitrogen, may also be utilized for purposes of reducing oxidation. In a typical operation, the mixture may comprise 1 pound of water for every 20 c.f.m. of gas. High pressures of at least 125 pounds per square inch can be readily employed with mixtures of this type, and the use of the high pressures contributes to the efficiency of the operation.

Other materials may also be employed as the blasting fluid depending upon the particular application. For example in processing molten lead, successful results can be obtained using air in the upper blast stream and oxygen in the second stream. Blends of certain materials such as sulfonated oils are also contemplated for use.

Oxidation of the product of a comminuting operation is a consistent problem. The system of this invention provides a product having reduced oxidation primarily due to the nozzle construction and fluid impingement aspects of the system. In prior methods, the fluid blast directed toward the molten stream would cause particles to spread over a wide area and, therefore, the particles were exposed to oxidizing conditions for a relatively long period before quenching. In the system of this invention, the particles are confined by the fluid blasts to a relatively small area, and the particles travel a very short distance before entering the quenching medium so that exposure to oxidizing conditions is greatly minimized.

An inert gas may be employed as the gas medium, and the oxidizing can then be even further reduced. A highly suitable atmosphere is developed due to the dense, humid and fog like atmosphere created by the non-vaporized portion of the air/gas and water mixtures of the fluid blasts.

The use of a tubular stream of molten material provides a relatively small cross-sectional area along with a large exposed surface area for impingement by the fluid blasts. Other nozzle configurations, for example, a nozzle which produces a strip of molten material, will also provide a relatively narrow cross section and a large exposed surface area. The nozzle configuration should generally conform with the configuration of the molten stream so that contact will occur all around the exposed surface.

Steel shot is usually produced in the form of spheres, and, as indicated, the instant invention is quite suitable for this purpose. A wide variety of other metal particles can also be produced, however, including precious metals. The invention is also suitable for the production of metal powder or small sized grit used in blast cleaning machines, and, in such instances, non-spherical particles are preferred. To provide this result, the chilling effect of the fluid from the last disintegrating blast should be sufficient so that the particles will not change their shape as they fall and enter the quenching tank. In the production of spherical particles, the spherical configuration may be formed during the descent of the disintegrated particles.

Control of the product characteristics is, as indicated, provided in part by the nozzle designs illustrated. These nozzles include channels which extend from fluid supply passages to the nozzle outlets. The channels are narrow and uniform in dimension with the length of the channels preferably being at least ⅓ the diameter of the central bore of the nozzle. The use of narrow channels shapes the blast streams into conically shaped streams having a minimum tendency to spread out or depart from a straight line path of travel until engagement with the molten stream. Even though the long channels have a tendency to slow down the fluid blasts because of the friction factor, the advantages of the channels greatly out-weigh this slight disadvantage.

It will be understood that various changes and modifications may be made in the above described construction which provide the characteristics of this invention without departing from the spirit thereof, particularly as defined in the following claims.

That which I claim is:

1. In an apparatus for producing comminuted material wherein a stream of molten material is subjected to a high pressure fluid blast whereby the material is broken into particles which will solidify when cooled, the improvement in means for handling said molten material and said fluid blast comprising a source of said molten material, means communicating with said source for delivering an unconfined, substantially intact stream of molten material, and nozzle means positioned adjacent an exposed surface of said unconfined stream, said nozzle means defining a first outlet for directing a portion of said fluid blast into contact with said stream at a location spaced from the end of the means delivering the stream, said fluid blast breaking up at least a portion of said stream, and at least one additional outlet defined by said nozzle means, said additional outlet being located downstream of said first outlet for directing an additional portion of said fluid blast into contact with said stream at a location displaced from the contact location of the fluid blast from said first outlet, said additional fluid blast contacting stream portions which have already been broken up, and means connected to said nozzle means for delivering the fluid under high pressure to said outlets to thereby form said fluid blasts, said nozzle means being formed in a nozzle housing with said outlets comprising annular openings defined in axially spaced relationship in the interior wall of said housing, a plurality of narrow channels extending inwardly from the interior wall through the body of said housing, said openings being formed at the ends of said channels, separate feed passages for delivering fluid to each of said openings, and an additional passage defined between said means for handling said molten material and said nozzle housing, at least a portion of the interior wall of said nozzle assembly extending beyond the end of said additional passage, the movement of said stream through said nozzle means and the movement of said fluid blasts creating suction which draws air through said additional passage thereby enhancing the flow of molten material.

2. An apparatus in accordance with claim 1 wherein said source comprises a holding furnace having an outlet opening communicating with a passage, and a valve means associated with said passage for regulating the flow of material through the passage, the material passing out of said stream of molten material.

3. An apparatus in accordance with claim 2 wherein said valve means comprises a plug portion positioned in said passage with the wall of the passage in spaced apart surrounding relationship thereto whereby an annular opening is provided for delivering a stream of material in tubular form.

4. An apparatus in accordance with claim 3 wherein said plug is reciprocally movable relative to said passage and is tapered relative to said wall whereby the flow rate of the tubular stream can be varied by moving said plug.

5. An apparatus in accordance with claim 4 wherein said plug is mounted on a vertically disposed shaft which extends through the back of material held in said furnace, and including splines formed on said shaft for engaging the wall of a continuation of said passage, said splines serving to maintain said shaft and plug in axial alignment with said passage, and wherein molten material from said furnace flows through openings defined between said splines and then into said passage.

6. An apparatus in accordance with claim 1 wherein the length of said narrow channels is at least one-third the diameter of said interior wall.

7. An apparatus in accordance with claim 1 wherein said channels extend angularly downwardly whereby said fluid blasts are directed into contact with said stream at an acute angle relative to the path of the stream.

8. An apparatus in accordance with claim 7 wherein said additional outlet is stepped outwardly from said stream relative to said first outlet.

9. An apparatus in accordance with claim 1 wherein said nozzle defines a circular inner wall.

10. An apparatus in accordance with claim 1 wherein three separate outlets are provided for delivering fluid blasts.

11. An apparatus in accordance with claim 1 wherein said stream is moved out of a holding vessel through an opening defined in the side wall of the vessel, and wherein said nozzle means extend horizontally in surrounding relationship relative to said stream.

12. An apparatus in accordance with claim 1 wherein narrow angularly disposed passages are formed in said nozzle means with the ends of said passages terminating in said outlets, and wherein the angles of said passages are such that lines extending therefrom will intersect at substantially the center of the stream passing through the nozzle.

13. An apparatus in accordance with claim 12 wherein said passages are in the shape of truncated cones.

14. An apparatus in accordance with claim 1 wherein narrow angularly disposed passages are formed in said nozzle means with the ends of said passages terminating in said outlets, and wherein the angles of said passages are such that lines extending therefrom are offset relative to the axis of said stream.

References Cited

UNITED STATES PATENTS

| 1,511,215 | 10/1924 | Calbeck | 239—422 |
| 2,006,891 | 7/1935 | Hegmann | 18—2.5M |
| 2,967,351 | 1/1961 | Roberts et al. | 264—12 |

FOREIGN PATENTS 481,642  10/1916  France.

RICHARD J. HERBST, Primary Examiner

U.S. Cl. X.R.

264—12